Oct. 17, 1944.  R. D. PHILBRICK  2,360,718
PELT STRETCHER
Filed June 22, 1943
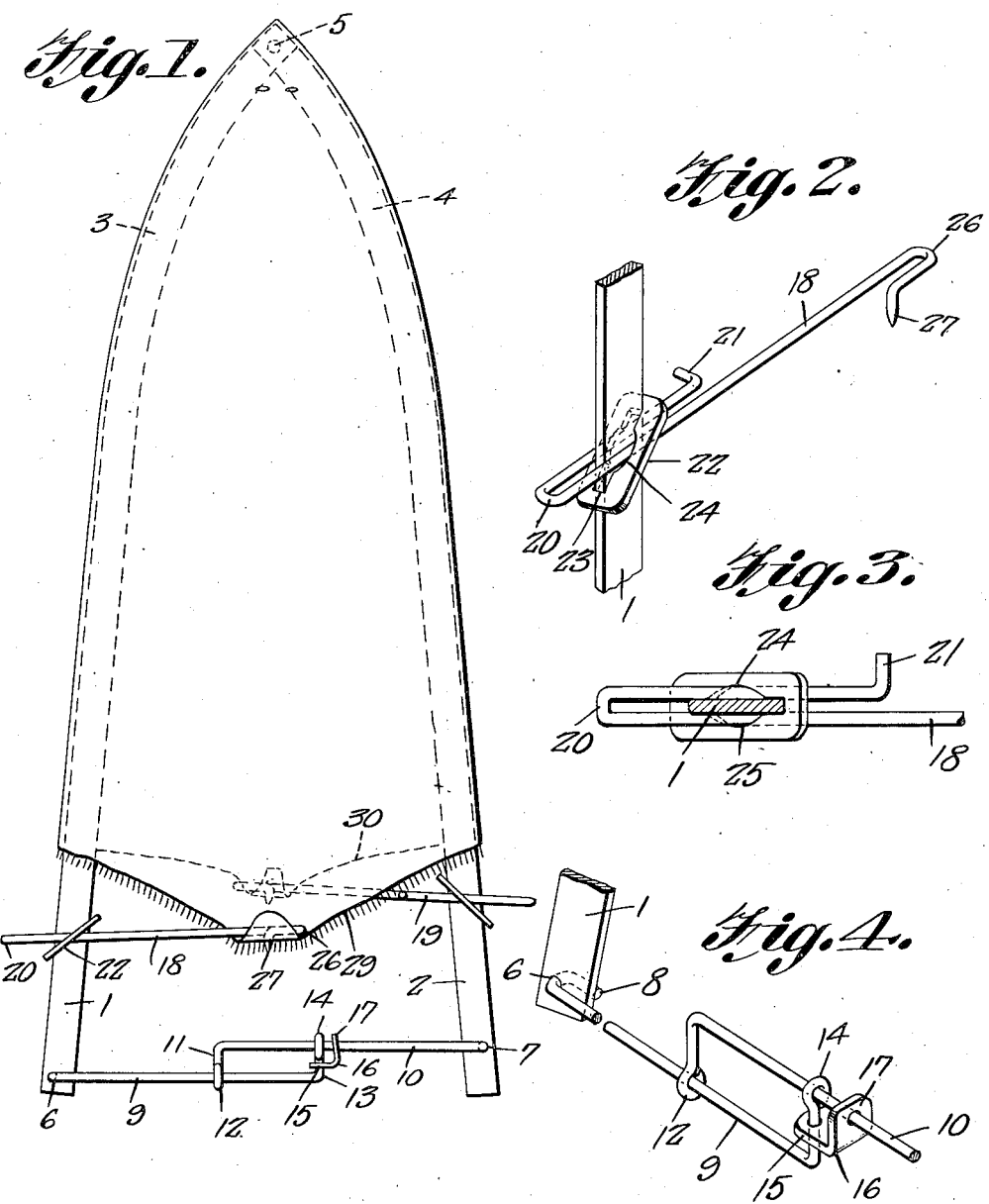
Raymond D. Philbrick,
INVENTOR.
BY Victor J. Evans & Co.
Attorneys Patented Oct. 17, 1944

2,360,718

UNITED STATES PATENT OFFICE 2,360,718

PELT STRETCHER

Raymond D. Philbrick, Ericson, Nebr.

Application June 22, 1943, Serial No. 491,818

4 Claims. (Cl. 45—24)

The invention relates to improvements in pelt stretchers.

The object of the invention is to provide a pelt stretcher which can be readily inserted and removed from the pelt and in which the pelt may be stretched to the desired degree, both transversely and longitudinally.

Another object of the invention is to provide a pelt stretcher which will not in any way injure the pelt and in which the longitudinal and transverse adjustments are entirely independent of each other, so that the pelt can be properly stretched throughout its length.

A further object of the invention is to provide a simple and effective device, which can be cheaply manufactured and having certain details of construction and combination of parts hereinafter more fully set forth.

In the accompanying drawing,

Figure 1 is a plan view of my improved stretcher with a pelt thereon;

Figure 2 is a perspective view of one of the longitudinal stretching members;

Figure 3 is a top plan view of Figure 2;

Figure 4 is a perspective view of the holding means for maintaining the pivoted stretching members in their outward spread position.

Referring now to the drawing, 1 and 2 represent the stretching arms, which are preferably made of flat metal and have their upper ends curved inwardly, as indicated at 3 and 4, and pivoted together at their extreme upper ends at 5. The lower ends of the stretching arms are provided with openings 6 and 7, through which extend the hooked ends 8 of the rods 9 and 10, whereby they have a limited free movement. The rod 10 is turned downwardly at 11, and provided with an eye 12, through which freely passes the rod 9. The outer end of the rod 9 is turned laterally at 13, and provided with an eye 14, through which the rod 10 freely passes. By this structure, it will be seen that the rods 9 and 10 are held together in parallel relation, but may be extended longitudinally. The laterally turned portion 13 of the rod 9 passes through the arm 15 of the L-shaped locking member 16. This locking member, as shown, is made of flat metal and the arm 17 is provided with an opening through which the rod 10 passes. It will thus be seen that the stretching arms can be readily spread apart and the locking member 16 holds them in their adjusted position.

In order to stretch the pelt longitudinally, I provide two stretching members 18 and 19, longitudinally adjustable on the stretching arms 1 and 2, as clearly shown in Figure 1 of the drawing. The stretching members are preferably made of bar metal and each member is provided with a looped end 20 of elongated form, and having a laterally turned end 21. Slidably mounted on the stretching arms are the locking plates 22, which have slots 23 of a length greater than the width of the arm, and provided with central curved cut-out portions 24 and 25, to allow the passage of the loop 20 on each side of the stretching arm. By this arrangement, it will be seen that the longitudinal stretching members can be readily adjusted longitudinally on the stretching arms and locked upon upward pressure thereon. The stretching members 18 and 19 are provided at their inner ends with the looped portions 26, having downwardly turned pointed ends 27, adapted to pierce the pelt, as will be hereinafter more fully described.

In operation, the two stretching arms are inserted in the pelt 28, which is turned wrong side out, as is well understood. The pointed ends 27 of the stretching members 18 and 19 are forced through the opposite sides 29 and 30 of the open end of the pelt, and moved downwardly on the stretching arms and the tension of the pelt will lock the same on the stretching arms. The stretching arms 1 and 2 are then forced apart to stretch the pelt the desired amount and the tension of the arms will, by means of the member 16, lock the rods 9 and 10 together and maintain the arms in their adjusted position.

Having thus described my invention, what I claim is:

1. A pelt stretcher, comprising two arms having curved upper ends pivoted together, rods pivoted at the lower ends of the arms and having laterally extending eyes adapted to receive each other, an L-shaped locking member co-operating with the rods for holding the same in their extended position, and longitudinally adjustable stretcher members carried by the arms and having inwardly extending portions provided with downwardly pointed ends adapted to pierce opposite sides of the lower end of the pelt.

2. A pelt stretcher, comprising two arms having curved upper ends pivoted together, rods pivoted at the lower ends of the arms and having laterally extending eyes adapted to receive each other, an L-shaped locking member co-operating with the rods for holding the same in their extended position, stretcher members having looped portions on the arms and pointed inner ends adapted to pierce opposite sides of the pelt, and diagonally arranged locking plates straddling the arms and the rods for locking the same in their adjusted positions on the arms.

3. In a pelt stretcher, a pair of arms pivotally connected at one end, a pair of rods pivotally connected with the free end portions of the respective arms and each rod having a laterally extending portion providing an eye adapted to receive the other rod, and an L-shaped locking member having apertures through which parts of the respective rods slidably pass, engaging the rods for releasably holding the same in adjusted position.

4. In a pelt stretcher, a pair of arms pivotally connected at one end, a stretcher member connected with each arm adjacent its free end and extending inwardly toward the other arm, said stretcher member having its outer portion slidably looped about the arm and a pelt engaging portion at its inner end, and a slotted plate slidably mounted on the arm and the outer looped portion of the stretcher member for releasably locking the latter in selectively adjusted position on the arm.

RAYMOND D. PHILBRICK.